(12) United States Patent
Tran et al.

(10) Patent No.: US 9,205,023 B2
(45) Date of Patent: Dec. 8, 2015

(54) INDUCTIVE COUPLING

(71) Applicants: Minh Sang Tran, Cambridge (CA); Chris Alexander, Cambridge (CA)

(72) Inventors: Minh Sang Tran, Cambridge (CA); Chris Alexander, Cambridge (CA)

(73) Assignee: GULFSTREAM INC., Cambridge, Ontario (CA)

( * ) Notice: Subject to any disclaimer, the term of this patent is extended or adjusted under 35 U.S.C. 154(b) by 151 days.

(21) Appl. No.: 13/863,037

(22) Filed: Apr. 15, 2013

(65) Prior Publication Data

US 2013/0269098 A1    Oct. 17, 2013

Related U.S. Application Data

(60) Provisional application No. 61/623,649, filed on Apr. 13, 2012.

(51) Int. Cl.
*A47K 3/00*     (2006.01)
*A61H 33/00*    (2006.01)
*H02K 49/10*    (2006.01)

(52) U.S. Cl.
CPC ........ *A61H 33/0091* (2013.01); *A61H 33/6063* (2013.01); *H02K 49/104* (2013.01); *A61H 2201/1215* (2013.01); *Y10T 464/30* (2015.01)

(58) Field of Classification Search
CPC ..... A61H 33/60; A61H 33/0091; F04D 13/06
USPC ................................. 4/541.1–541.6; 417/420
See application file for complete search history.

(56) References Cited

U.S. PATENT DOCUMENTS

| 4,982,461 | A | * | 1/1991 | Mikiya et al. | .................. 4/541.3 |
| 5,752,282 | A | * | 5/1998 | Silveri | ............................ 4/541.1 |
| 2009/0320202 | A1 | * | 12/2009 | Lawyer et al. | ................. 4/541.1 |

* cited by examiner

*Primary Examiner* — Huyen Le
*Assistant Examiner* — Christine Skubinna
(74) *Attorney, Agent, or Firm* — Avery N. Goldstein; Blue Filament Law (57) ABSTRACT

A drive hub is mounted to an element and has a surface which presents away from the element and produces a magnetic field which extends from and returns to the drive hub. If depicted graphically, concentrations of field lines would appear to extend from two or more North domains defined in the surface to two or more South domains defined in the surface, the North and South domains being arranged to encircle a rotation axis in spaced alternating relation. A driven hub is spaced and frontwardly adjacent to drive hub, coupled to the element and constrained against movement but for axial rotation. Driven hub includes non-magnetic, electrically-conductive material having low magnetic permeability and receptors, receptors having a high magnetically permeability, being spaced to the axis and arranged such that rotation of the drive hub relative to the driven hub creates a net rotational force that urges co-rotation of the hubs.

22 Claims, 12 Drawing Sheets

INDUCTIVE COUPLING

REFERENCE TO RELATED APPLICATIONS

This application claims priority to U.S. Provisional Patent Application Ser. No. 61/623,649 filed Apr. 13, 2012, which is incorporated herein by reference.

FIELD OF THE INVENTION

The present invention relates to the field of couplings.

BACKGROUND OF THE INVENTION

It is known to provide for a magnetic coupling between an impeller and a motor in the context of foot spa units. In known couplings, high performance permanent magnets are used in pairs.

SUMMARY OF THE INVENTION

Forming one aspect of the invention is apparatus for coupling a rotating element to a rotatable element, the rotating element rotating around a rotation axis. This apparatus comprises a drive hub and a driven hub. The drive hub: in use, is mounted to the rotating element for rotation therewith about the rotation axis; has a front surface which presents away from the rotating element in use; and has magnetic properties such that, in the absence of externalities, a magnetic field is produced which extends from and returns to the drive hub, the magnetic field being characterized in that, if depicted graphically, concentrations of field lines would appear to extend from two or more North pole domains defined in the front surface to two or more South pole domains defined in the front surface, the North and South pole domains being spaced apart from each other and arranged to encircle the rotation axis in alternating relation. The driven hub: in use, is disposed in spaced, frontwardly adjacent relation to the drive hub, is fixedly coupled to the rotatable element and is at least substantially constrained against movement but for rotation, with the rotatable element, about the rotation axis; and includes a rotor body of a non-magnetic, electrically-conductive material having relatively low magnetic permeability and a plurality of receptors, the receptors being made at least in part of material having a relatively high magnetically permeability and arranged in spaced relation to the rotation axis. The receptors are arranged such that rotation of the drive hub relative to the driven hub creates a net rotational force on the driven hub that urges the driven hub to rotate in the same direction as the drive hub.

According to another aspect of the invention, the receptors can provide for magnetic field lines that pass through the rotor body in a manner such that, in the aggregate, the through-passing field lines are dominated by field lines that extend through the rotor body in a direction that is substantially tangential to the direction of rotation.

According to another aspect of the invention, each of the North pole domains can be defined by a respective permanent magnet and each of the South pole domains can be defined by a respective permanent magnet.

According to another aspect of the invention, the number of North pole domains can equal the number of South pole domains.

According to another aspect of the invention, in use, the permanent magnets can be equally spaced about the rotation axis.

According to another aspect of the invention, the drive hub can have a backer plate defined by a material having relatively high magnetic permeability.

According to another aspect of the invention, the drive hub can have a backer plate defined by a ferromagnetic material.

According to another aspect of the invention, the drive hub can have a backer plate defined by an iron alloy.

According to another aspect of the invention, the rotor body can be made of a paramagnetic material.

According to another aspect of the invention, the rotor body can be made of an aluminum alloy.

According to another aspect of the invention, the receptors can be made from a ferromagnetic material.

According to another aspect of the invention, the receptors can be made of an iron alloy.

According to another aspect of the invention, the driven hub can have a face disk defined by a material having relatively high magnetic permeability, the face disk being coupled to the rotatable element in use.

According to another aspect of the invention, the face disc can be made of a ferromagnetic material.

According to another aspect of the invention, the face disc can be made of an iron alloy.

According to another aspect of the invention, R can equal N+S−1 or N+S+1 wherein N=the number of North pole domains;
S=the number of South pole domains; and
R=the number of receptors.

According to another aspect of the invention, N can be 2, S can be 2 and R can be 3.

According to another aspect of the invention, the permanent magnets can be disc-shaped.

According to another aspect of the invention: each receptor can include a rod-shaped primary receiver; the primary receivers can be equally spaced from one another about the rotation axis; and the distance from the centre of each primary receiver to the rotational axis can be at least substantially equal to the distance between the centre of each permanent magnet and the rotation axis.

According to another aspect of the invention: each receptor can include a pair of rod-shaped secondary receivers; in each receptor, the secondary receivers can be equally spaced from the centre of the primary receiver; and in each receptor, the pair of rod-shaped secondary receivers and the primary receiver can be all arranged in a line which does not intersect the rotation axis.

According to another aspect of the invention, each of the primary receivers can be intersected by two of the lines.

According to another aspect of the invention, with respect to each receptor, the shortest distance between a secondary receiver of said each receptor and the primary receiver that forms no part of said each receptor and is intersected by the line associated with said each receptor can at least substantially equal the distance between the secondary receivers of said each receptor.

The apparatus can be used as part of an improved spa, which forms another aspect of the invention. The spa includes; a basin for containing water; a motor mounted exteriorly of the basin and having a rotating shaft; and a centrifugal pump mounted interiorly of the basin and including an impeller which, in use, is rotated by the motor for circulating water contained in the basin. The improvement comprises the apparatus in use such that the rotating shaft defines the rotating element and the impeller defines the rotatable element.

Other advantages of the present invention will become evident upon review of the accompanying detailed description and drawings, the latter being briefly described hereinafter.

DETAILED DESCRIPTION

An exemplary embodiment of the present invention is described in detail in the following paragraphs.

However, by way of background, reference is now made to FIGS. 1-4, which show a prior art spa product.

This spa will be seen to include: a basin; a motor, encompassed by encircled area 11; and a centrifugal pump, encompassed by encircled area 2.

The basin is for containing water.

The motor is mounted exteriorly of the basin.

Figure 4:
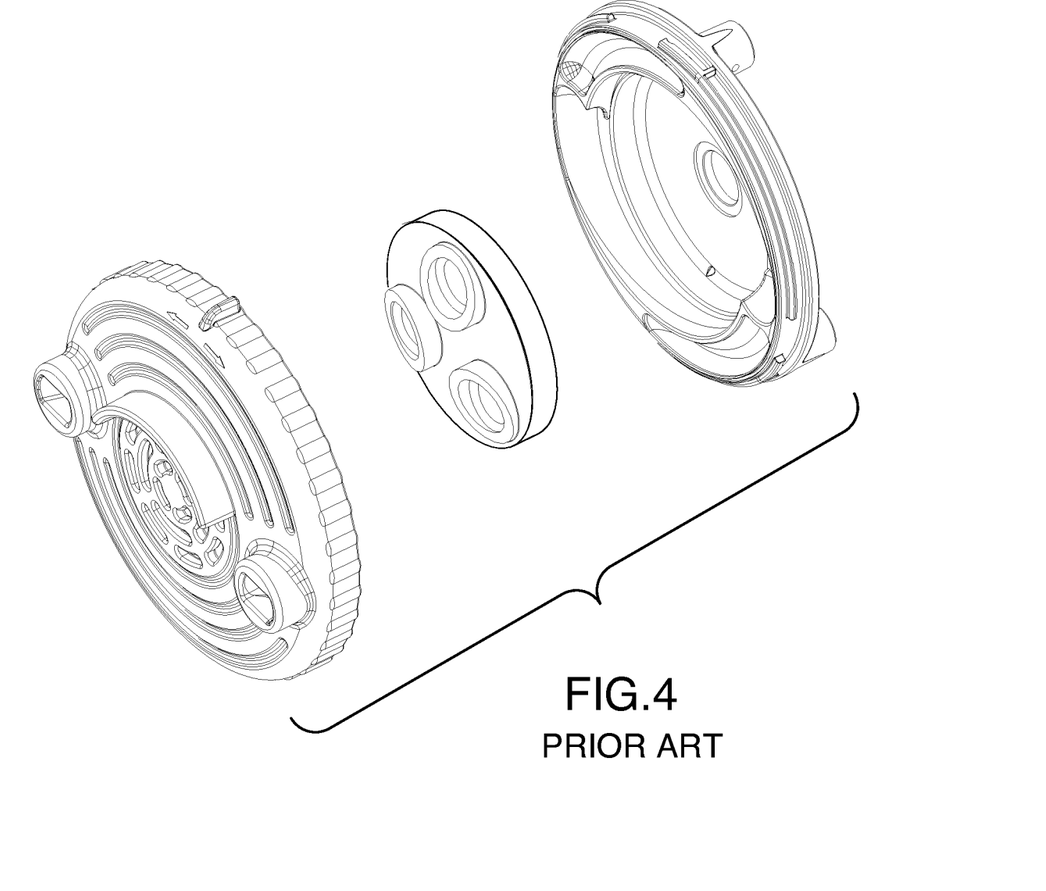
FIG. 4 is an exploded perspective view of encircled structure 2 of FIG. 1.

The pump is positioned interiorly of the basin and has an impeller, as seen in exploded view FIG. 4.

The prior art spa will also be understood to include a coupling constructed in accordance with the teachings of U.S. Pat. No. 7,393,188 and US 2011/0176943, incorporated herein by reference. This prior art coupling, not shown, is defined by a series of permanent magnets fixed to the motor for rotation, and a further series of permanent magnets fixed to the impeller.

Figure 1:
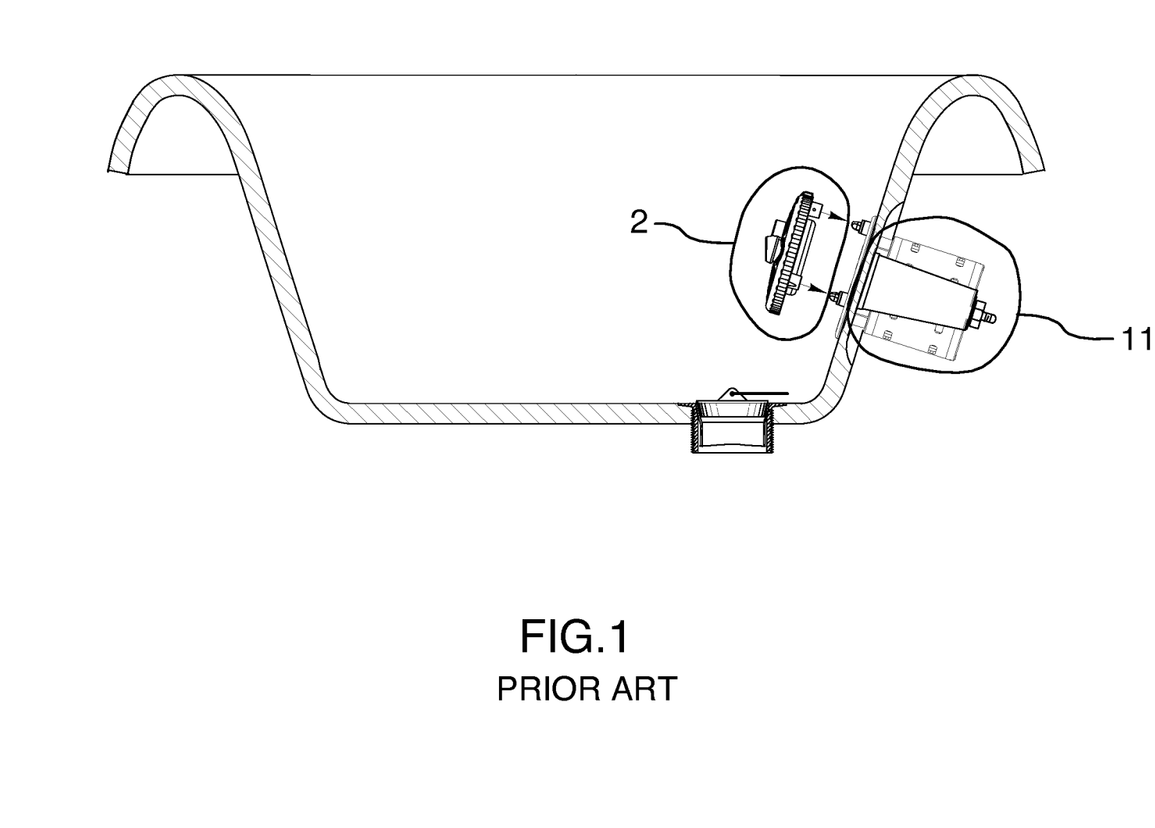
FIG. 1 is cross-sectional, partially exploded view of a foot spa according to the prior art.
Figures 2, 3:
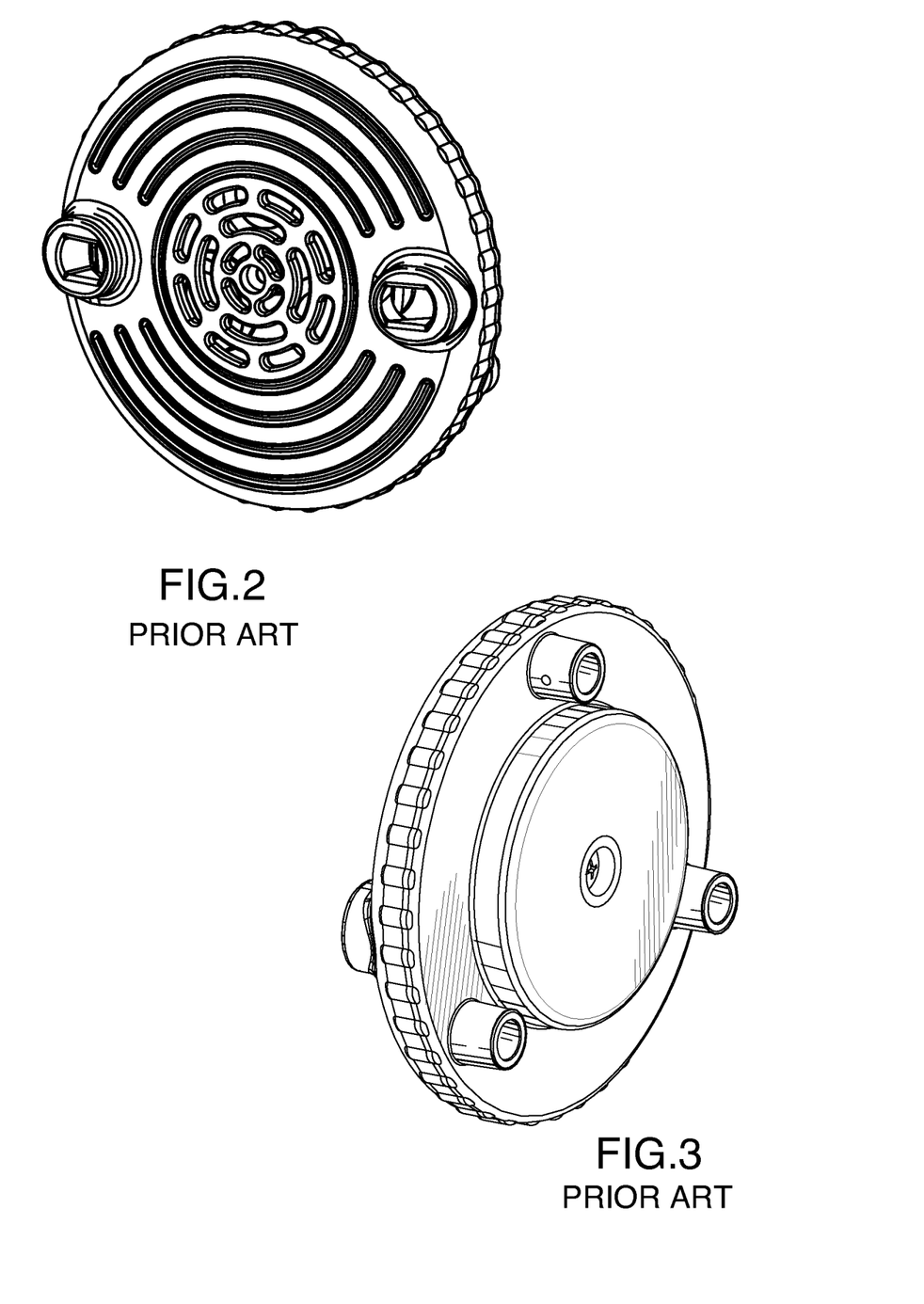
FIG. 2 is a front perspective view of encircled structure 2 of FIG. 1.
FIG. 3 is a rear perspective view of encircled structure 2 of FIG. 1.

The attraction between these magnets serves to releasably mount the impeller, and the balance of the pump within it is housed, to the basin and also to rotatably couple the impeller to the drive shaft. Pin and socket connections are shown in FIG. 1, but it will be appreciated that these connections serve only to hold the pump in position and against rotation; it is indeed magnetic attraction that holds the pump to the basin.

Notably, a 1:1 paired relationship exists between the magnets of the motor and the magnets of the impeller: for each magnet fixed to the motor there is provided a magnet fixed to the impeller.

This arrangement has been well-received in the marketplace.

Reference is now made to FIGS. 5-12, which show an improved spa 20 which represents an advance over that of FIGS. 1-4.

Figure 5:
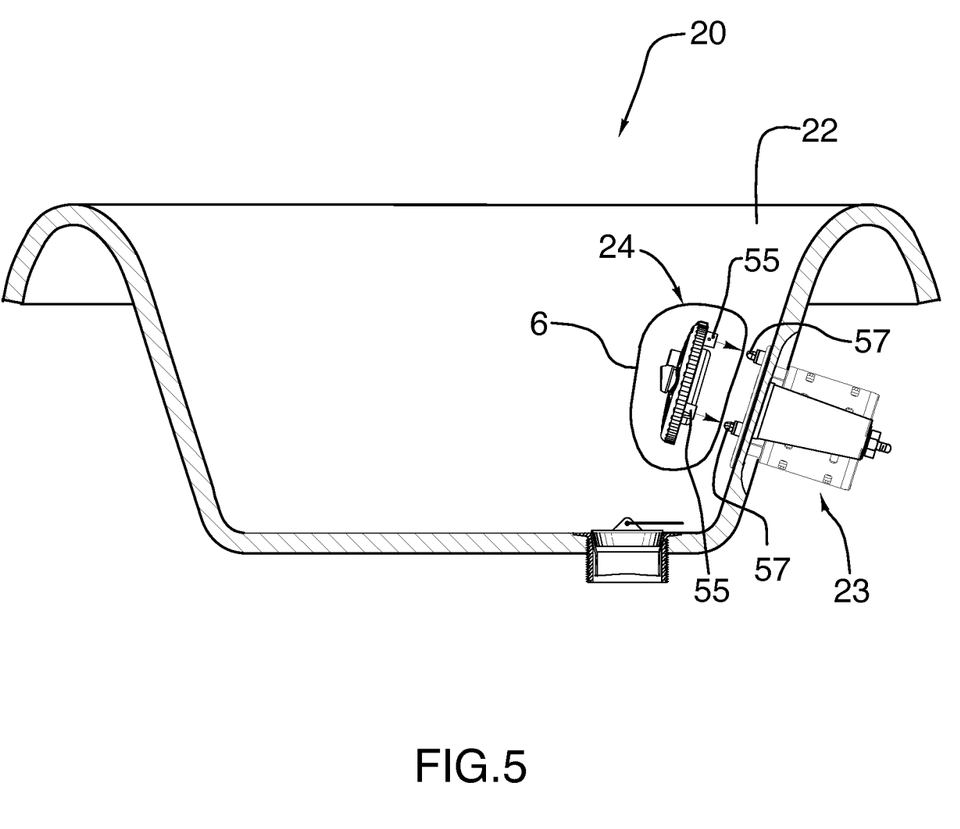
FIG. 5 is a view similar to FIG. 1 showing a foot spa according to an exemplary embodiment of the invention.
Figure 6:
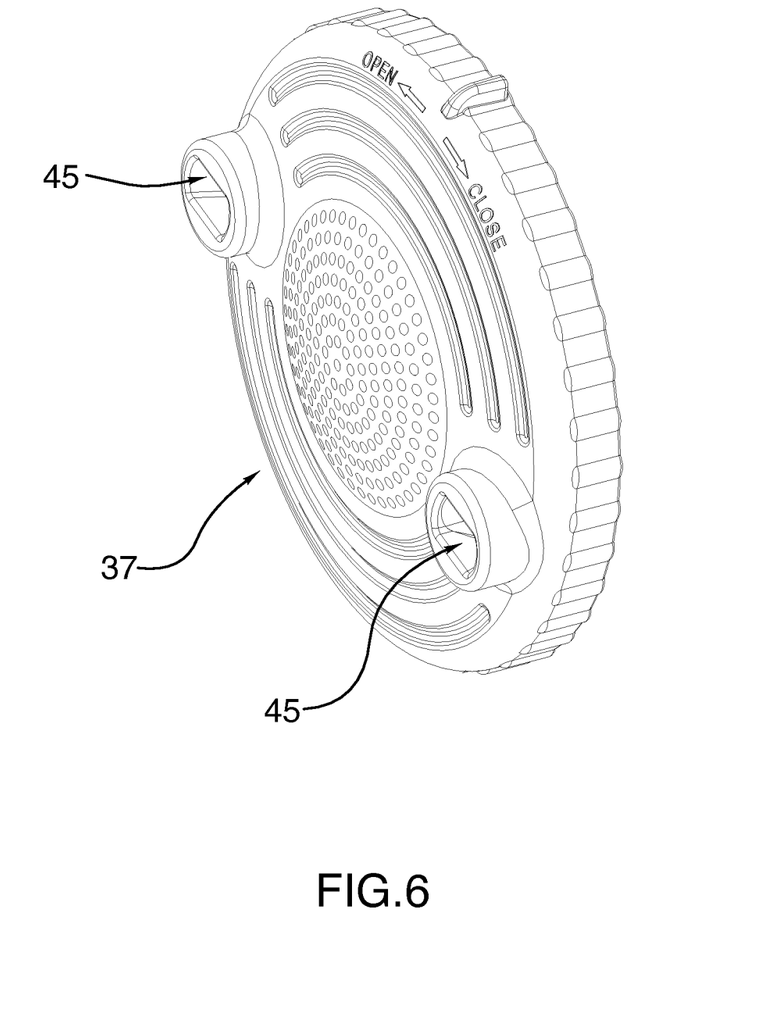
FIG. 6 is a perspective view of encircled structure 6 of FIG. 3.
Figure 7:
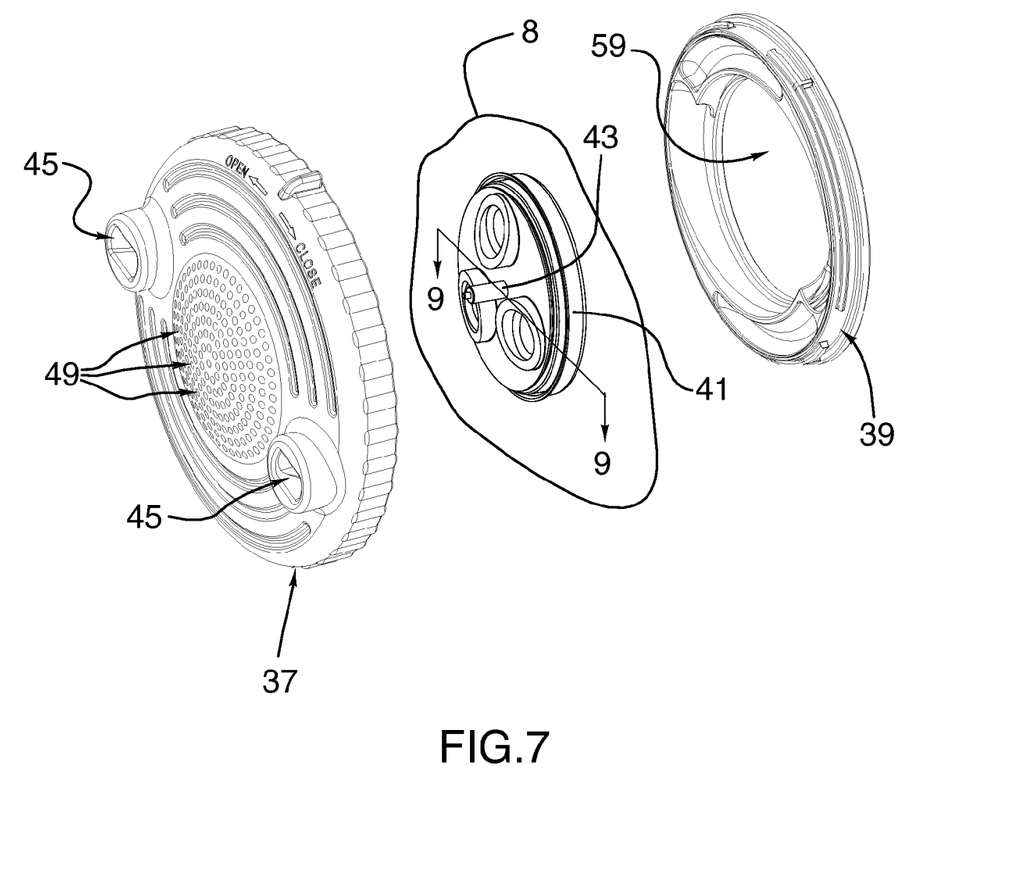
FIG. 7 is a partially exploded view of the structure of FIG. 6.

This spa 20 continues to include a basin 22, a motor 23 and a pump 24 which are all generally similar to the corresponding structures of the prior art but for the coupling 26,28 between the impeller 27 and motor 23.

The inventive coupling, shown by way of example in FIGS. 6-10, comprises a drive hub 26 fixedly coupled to the motor 23 for rotation and a driven hub 28 which, in use, is disposed in spaced, frontwardly adjacent relation to the drive hub 26, is fixedly coupled to the rotatable element, i.e. the impeller 27 portion of the pump 24, and is at least substantially constrained against movement but for rotation, with the rotatable element, about the rotation axis X-X.

In the illustrated embodiment, this constraint is provided by capturing the driven hub 28 in a chamber defined by an intake disc 37, a backer ring 39 and a bearing pan 41 from which a spindle 43 extends. The intake disc 37 is an injection molded plastic component which defines the jet outlets 45 of the pump and the water inlets 49. The backer ring 39 is secured to the intake disc 37 by sonic welding or the like, carries a plurality of sockets 55 for engagement with the basin pins 57, and defines an aperture 59. The bearing pan 41 is a shallow disc adapted for press-fit engagement in the aperture 59, and has the spindle 43 extending therefrom. The spindle 43 is adapted to receive the driven hub 28 for rotation thereabout, and to support the driven hub 28 in spaced relation from the bearing pan 41, to avoid friction.

Figures 10, 11:
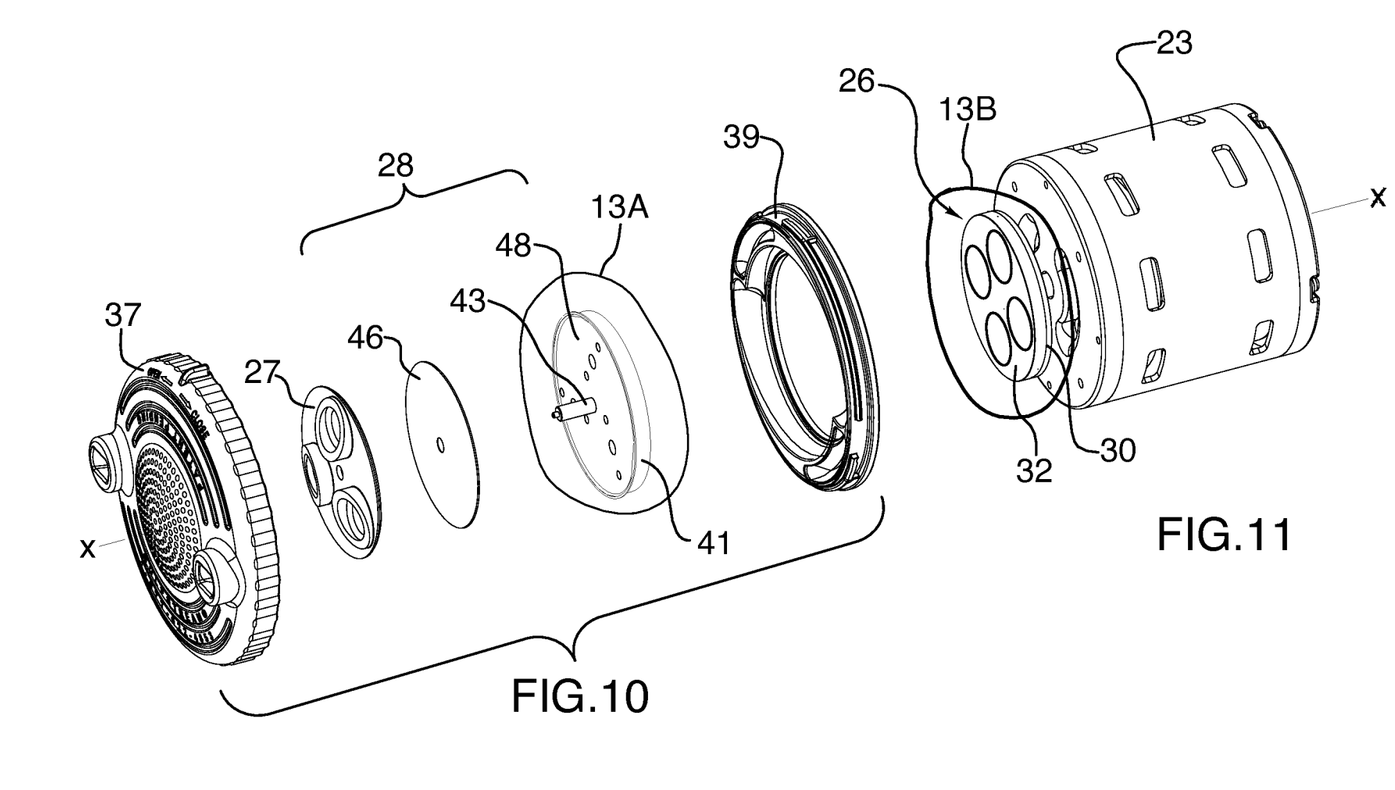
FIG. 10 is another partially exploded view of the structure of FIG. 6.
FIG. 11 is a view showing the counterpart to encircled structure 11 of FIG. 1 in the exemplary embodiment.

The exemplary drive hub 26 is shown mounted to the motor 23 in FIG. 11 and will be seen to include a backer plate 30 and a drive body 32.

The backer plate 30 is made of a ferromagnetic material, namely, an iron alloy, so as to have high magnetic permeability, and is coupled to the drive shaft (not shown) of the motor 23.

The drive body 32 is a disc of aluminum alloy coupled to the side of the backer plate 30 opposite to that which is coupled to the drive shaft of the motor 23.

Figure 12:
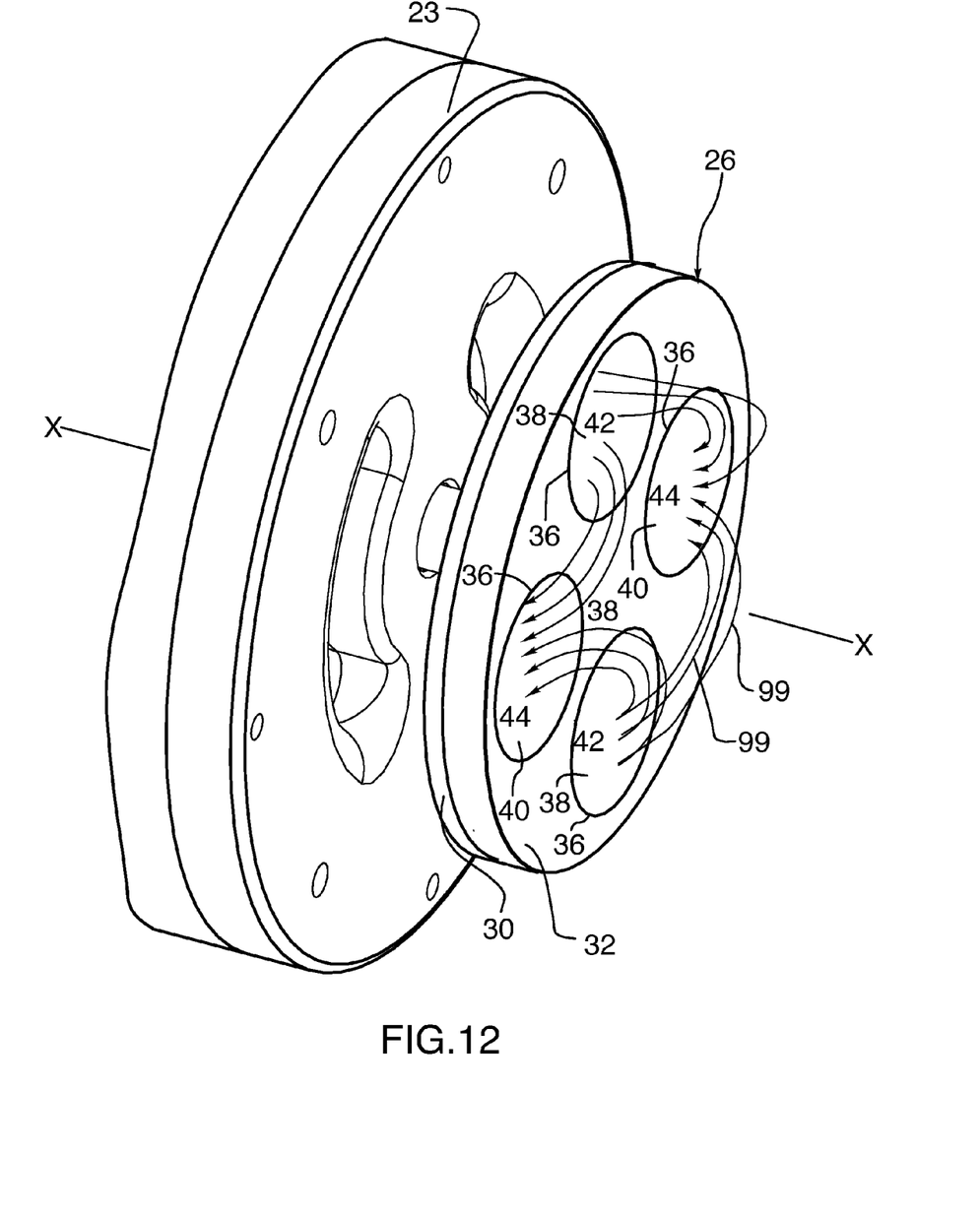
FIG. 12 is a view of the structure of FIG. 11, showing magnetic field lines.

As seen in FIG. 12, defined within the drive body 32 are four sockets 36, spaced apart from each other and arranged to encircle the rotation axis X-X.

Mounted in each socket 36 is a disc-shaped permanent Neodyium magnet 38,38,40,40, the poles being arranged in alternating relation such that, in the front face of the drive hub, i.e. the face opposite the backer plate 30, there are defined two North pole domains 42 and two South pole domains 44.

The magnetic properties of this arrangement in the absence of externalities are depicted in idealized fashion in FIG. 12; herein, a magnetic field which extends from and returns to the hub 26 is shown, the magnetic field being characterized in that, field lines 99 extend from the two North pole domains 42 to the two South pole domains 44. The magnetic field lines 99 emanating from the backside of the driven hub 28 are not shown, for reasons of clarity, but will understood to be concentrated within the backer plate 30, by virtue of the ferromagnetic nature thereof.

Figure 8:
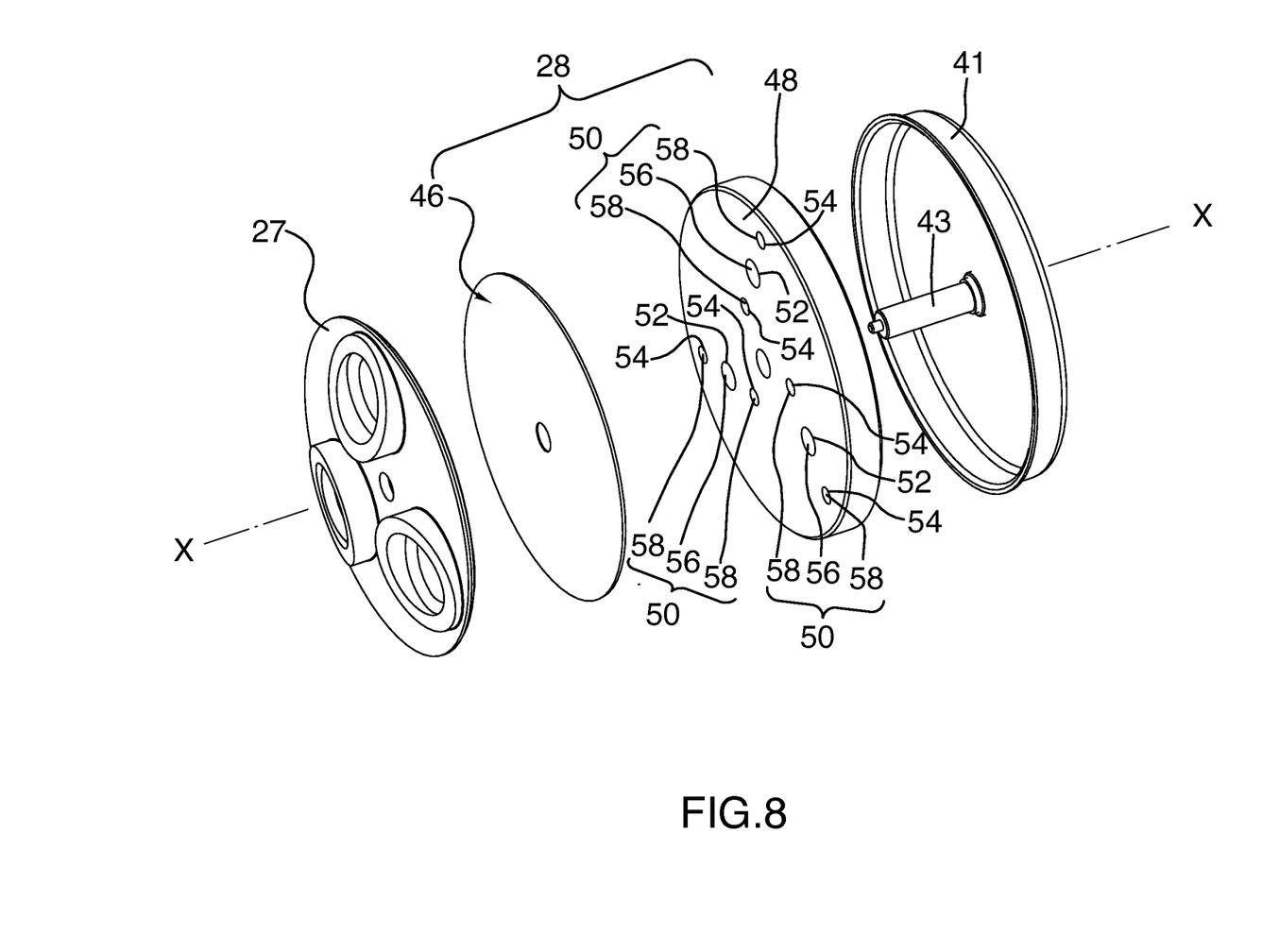
FIG. 8 is an exploded view of the structure of encircled area 8 of FIG. 7.
Figure 9:
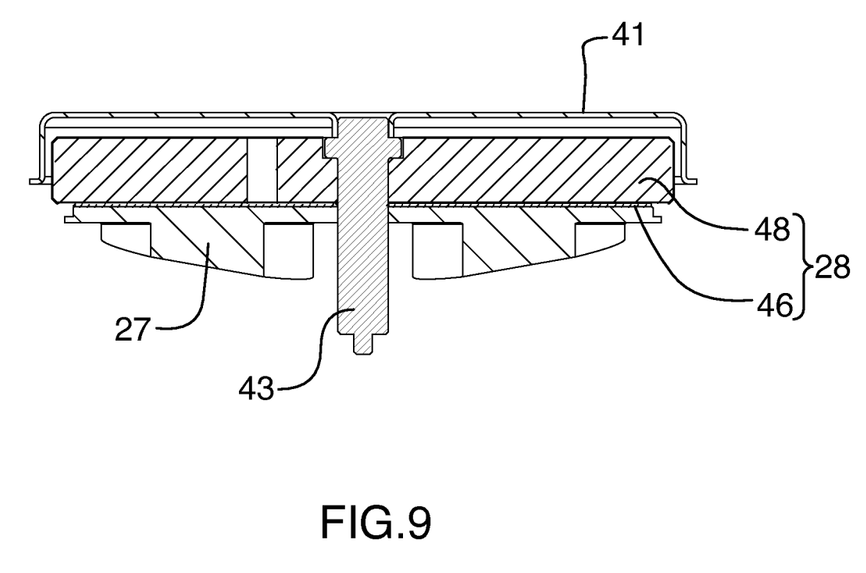
FIG. 9 is a view along section 9-9 of FIG. 7.

The driven hub 28 is shown in exploded view in FIG. 8 and will be seen to include a face disk 46, a rotor body 48 and a plurality of receptors 50.

The face disk 46 is constructed of a ferromagnetic material having high magnetic permeability, namely, an iron alloy, and is coupled to the impeller 27 in use.

The rotor body 48 is a constructed out of a non-magnetic, electrically conductive material having relatively low magnetic permeability, specifically, an aluminum alloy, and has a plurality of bores 52,54 defined therein.

Figure 13:
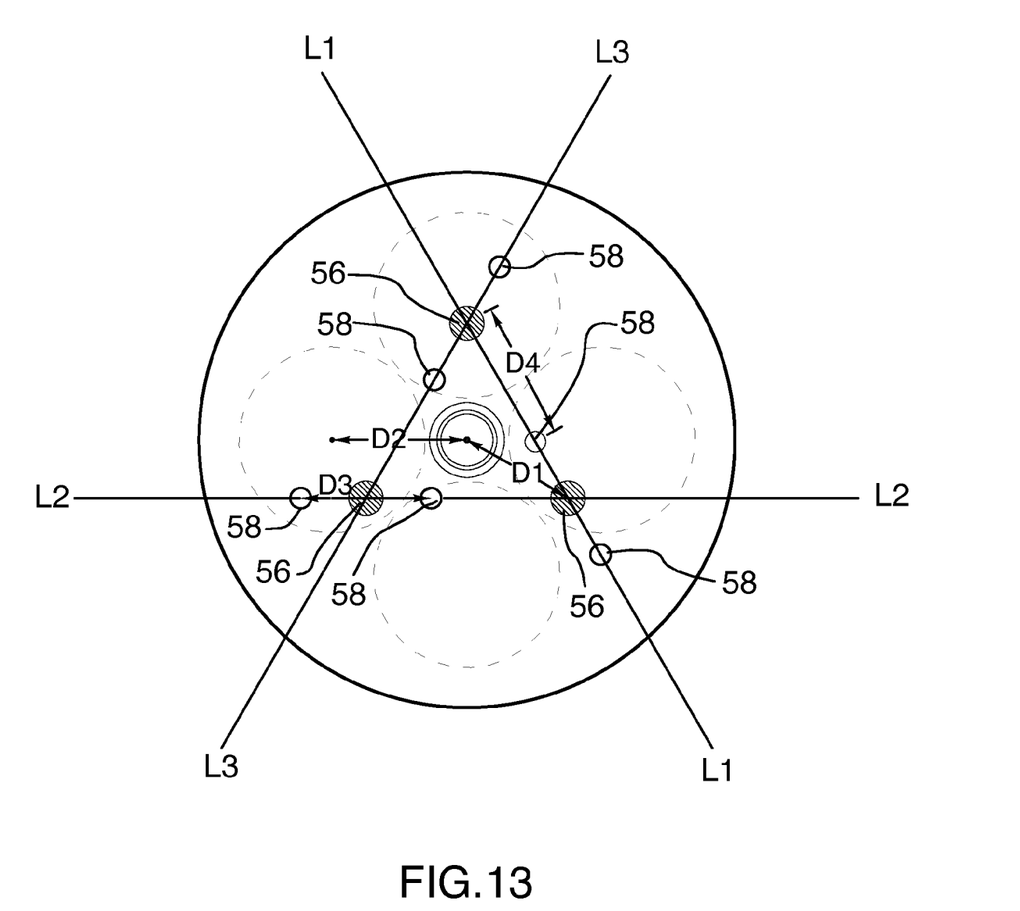
FIG. 13 is an end view showing the relationship between the structure of encircled area 13A of FIG. 10 to encircled structure 13B of FIG. 11, in use.

Each receptor 50 includes a primary receiver 56 and a pair of secondary receivers 58. The primary 56 and secondary 58 receivers are rod-shaped, mounted one within each bore 52,54 and are made of ferromagnetic material, namely, iron alloy, the bores being arranged such, as seen in FIG. 13, that: the primary receivers 56 are equally spaced from one another about the rotation axis X-X the distance D1 from the centre of each primary receiver 56 to the rotational axis X-X is at least substantially equal to the distance D2 between the centre of each permanent magnet 38,40 and the rotation axis X-X in each receptor, the pair of rod-shaped secondary receivers 58 and the primary receiver 56 are all arranged in an associated line L1,L2,L3 which does not intersect the rotation axis each of the primary receivers 56 is intersected by two of the lines the secondary receivers 58 of each receptor 50 are equally spaced from the centre of the primary receiver 56 thereof with respect to each receptor 50, the shortest distance D4 between a secondary receiver 58 of said each receptor and the primary receiver 56 intersected by the line associated with said each receptor 50, at least substantially equals the distance D3 between the secondary receivers 58 of said each receptor 50

Figure 14:
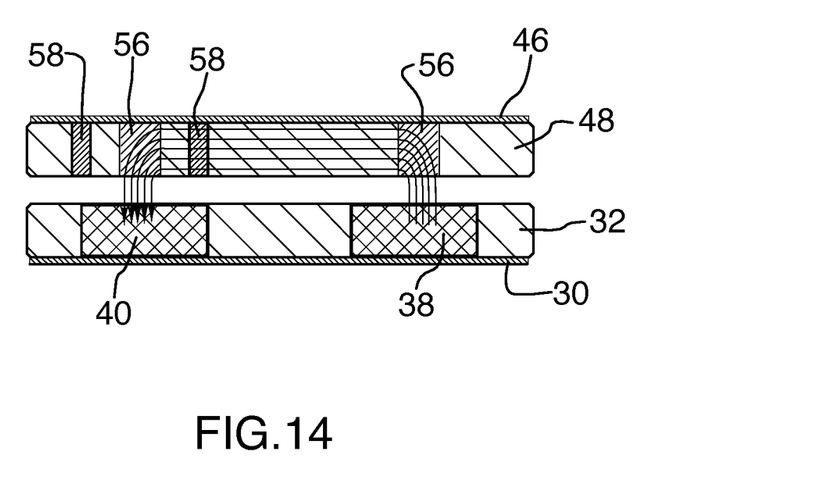
FIG. 14 is a schematic view showing a postulated flux arrangement, viewed along L1-L1 of FIG. 13, of the structure of FIG. 5 in use.

This arrangement of the receptors 50 is such that rotation of the drive hub 26 relative to driven hub 28 urges the driven hub 28 to rotate in the same direction as the drive hub 26. Without intending to be bound by theory, it is believed that (i) this arrangement provides for magnetic field lines that pass through the rotor body in a manner such that, in the aggregate, the through-passing field lines are dominated by field lines that extend through the rotor body in a direction that is substantially tangential to the direction of rotation axis, as shown in FIG. 14, (ii) this phenomenon being well suited to produce a strong induced magnetic coupling.

An advantage of this arrangement is that, in contrast to the prior art coupling discussed hereinbefore, the coupling of the present invention can be removed and replaced without bringing the motor to rest. [In the prior art coupling, the inertia of the driven hub is too large to permit a dynamic magnet coupling at normal operating speeds: if the pump is, for example, dislodged in use, any attempt to replace the pump while the motor remains in motion will simply result in vibration of the impeller; no useful rotation will occur.]

Yet further, motors used with the present coupling are less susceptible to burn-out than motors used with the prior art coupling. In the prior art, if the impeller is restrained against rotation, such as occurs if the pump becomes plugged, the motor is also restrained against rotation by the magnetic force; this is not the case with the present coupling.

Notable about this arrangement is that the permanent magnets reside only on the motor, therefore tending to reduce the cost associated with the pump assembly. This is also advantageous, as pumps are susceptible to damage and clogging and are therefore more frequently replaced than motors.

Whereas, but a single exemplary embodiment of the invention is herein described, variations are possible.

For example, it is not essential that, as in the exemplary embodiment illustrated:

N = the number of North pole domains in the front face = 2
S = the number of South pole domains in the front face = 2
R = the number of receptors = N + S − 1 = 3

N and S could, for example, each equal 3. As well, for example, R could equal N+S+1. All that is required is that the receptors be arranged so as to avoid resonance and provide the (suspected inductive) coupling provided by the present invention.

As well, whereas the illustrated receptors include a primary and a pair of secondary receivers, arranged in intersecting lines, this is not critical: it is known, for example, that the secondary receivers can be omitted entirely, albeit with a modest decrease in coupling efficacy. Primary receivers can be omitted entirely, with a significant decrease in coupling efficacy. [Omission of both primary and secondary receivers results in a coupling that lacks practical utility; while it is believed that inductive couplings can be made without receptors as found in the present invention, such couplings would require permanent magnets of vastly greater strength, and commensurately, much higher cost and weight.]

As well, whereas various specific materials, such as aluminum alloy, iron alloy and Neodyium are herein specified, it is understood that other materials, having similar magnetic properties, can be readily substituted therefore.

Without limitation, whereas the exemplary rotor body is described to be an aluminum alloy, i.e. a paramagnetic material, this is not believed to be essential, and other non-magnetic, electrically conductive materials can be substituted therefor.

As well, whereas the size and placement of the receivers in the illustrated embodiment is known to be useful, this is not critical. Variations can be made, and other arrangement may be as good as, or better than, that described. Notably, adding more ferromagnetic material to the driven hub can reduce coupling efficacy.

Figure 15:
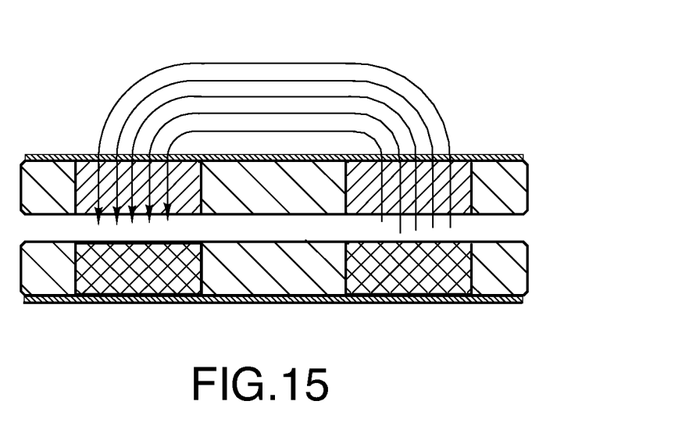
FIG. 15 is a view similar to FIG. 14, showing another geometry and the postulated flux arrangement thereof.

Without intending to be bound by theory, it is believed that additional iron can cause the magnetic flux lines to substantially bypass the rotor body altogether, as shown in FIG. 15, thereby reducing, rather than increasing, the postulated induced currents.

Further, whereas the illustrated embodiment shows the use of iron alloys, i.e. ferromagnetic materials, in all components wherein relatively high magnetic permeability is required, ferromagnetic properties may not be necessary and iron alloys is certainly not necessary.

Accordingly, the invention should be understood as limited only by the accompanying claims, purposively construed.

The invention claimed is:

1. Apparatus for coupling a rotating element to a rotatable element, the rotating element rotating around a rotation axis, the apparatus comprising:
a drive hub which, in use, is mounted to the rotating element for rotation therewith about the rotation axis, the hub having a front surface which presents away from the rotating element and having magnetic properties such that, in the absence of externalities, a magnetic field is produced which extends from and returns to the drive hub, the magnetic field being characterized in that, if depicted graphically, concentrations of field lines would appear to extend from two or more North pole domains defined in the front surface to two or more South pole domains defined in the front surface, the North and South pole domains being spaced apart from each other and arranged to encircle the rotation axis in alternating relation; and a driven hub which, in use, is disposed in spaced, frontwardly adjacent relation to the drive hub, is fixedly coupled to the rotatable element and is at least substantially constrained against movement but for rotation, with the rotatable element, about the rotation axis, the driven hub including a rotor body of a non-magnetic, electrically-conductive material having relatively low magnetic permeability and a plurality of receptors, the receptors being made at least in part of material having a relatively high magnetically permeability and arranged in spaced relation to the rotation axis, wherein the receptors are arranged such that rotation of the drive hub relative to the driven hub creates a net rotational force on the driven hub that urges the driven hub to rotate in the same direction as the drive hub, and wherein R=N+S−1 or N+S+1 when:
N=the number of said North pole domains;
S=the number of said South pole domains; and
R=the number of said plurality of receptors.

2. Apparatus according to claim 1, wherein the receptors provide for magnetic field lines that pass through the rotor body in a manner such that, in the aggregate, the through-passing field lines are dominated by field lines that extend through the rotor body in a direction that is substantially tangential to the direction of rotation.

3. Apparatus according to claim 1, wherein each of the North pole domains is defined by a respective permanent magnet and each of the South pole domains is defined by a respective permanent magnet.

4. Apparatus according to claim 3, wherein the number of North pole domains equals the number of South pole domains.

5. Apparatus according to claim 3, wherein, in use, the permanent magnets are equally spaced about the rotation axis.

6. Apparatus according to claim 3, wherein the drive hub has a backer plate defined by a material having relatively high magnetic permeability.

7. Apparatus according to claim 3, wherein the drive hub has a backer plate defined by a ferromagnetic material.

8. Apparatus according to claim 3, wherein the drive hub has a backer plate defined by an iron alloy.

9. Apparatus according to claim 1, wherein the rotor body is a made of a paramagnetic material.

10. Apparatus according to claim 1, wherein the rotor body is made of an aluminum alloy.

11. Apparatus according to claim 1, wherein the receptors are made from a ferromagnetic material.

12. Apparatus according to claim 1, wherein the receptors are made of an iron alloy.

13. Apparatus according to claim 1, wherein the driven hub has a face disk defined by a material having relatively high magnetic permeability, the face disk being coupled to the rotatable element in use.

14. Apparatus according to claim 13, wherein the face disc is made of a ferromagnetic material.

15. Apparatus according to claim 13, wherein the face disc is made of an iron alloy.

16. Apparatus according to claim 1, wherein N=2, S=2 and R=3.

17. Apparatus according to claim 3, wherein the permanent magnets are disc-shaped.

18. Apparatus according to claim 17, wherein:
each receptor includes a rod-shaped primary receiver;
the primary receivers are equally spaced from one another about the rotation axis; and
the distance from the centre of each primary receiver to the rotational axis is at least substantially equal to the distance between the centre of each permanent magnet and the rotation axis.

19. Apparatus according to claim 18, wherein:
each receptor includes a pair of rod-shaped secondary receivers;
in each receptor, the secondary receivers are equally spaced from the centre of the primary receiver; and
in each receptor, the pair of rod-shaped secondary receivers and the primary receiver are all arranged in a line which does not intersect the rotation axis.

20. Apparatus according to claim 19, wherein each of the primary receivers is intersected by two of the lines.

21. Apparatus according to claim 20, wherein, with respect to each receptor, the shortest distance between a secondary receiver of said each receptor and the primary receiver that forms no part of said each receptor and is intersected by the line associated with said each receptor at least substantially equals the distance between the secondary receivers of said each receptor.

22. An improved spa comprising:
a basin for containing water;
a motor mounted exteriorly of the basin and having a rotating shaft; and
a centrifugal pump mounted interiorly of the basin and including an impeller which, in use, is rotated by the motor for circulating water contained in the basin, wherein the improvement comprises: the apparatus of claim 1 in use such that the rotating shaft defines the rotating element and the impeller defines the rotatable element.

* * * * *